March 3, 1936.   C. C. WORTHINGTON   2,032,784
GANG LAWN MOWER
Filed March 10, 1933
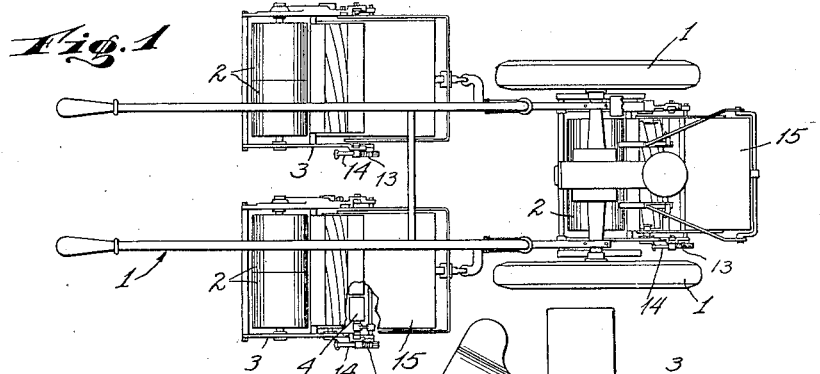
Fig. 1
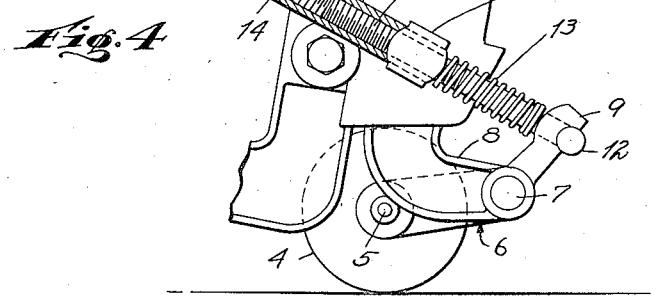
Fig. 4
Fig. 2
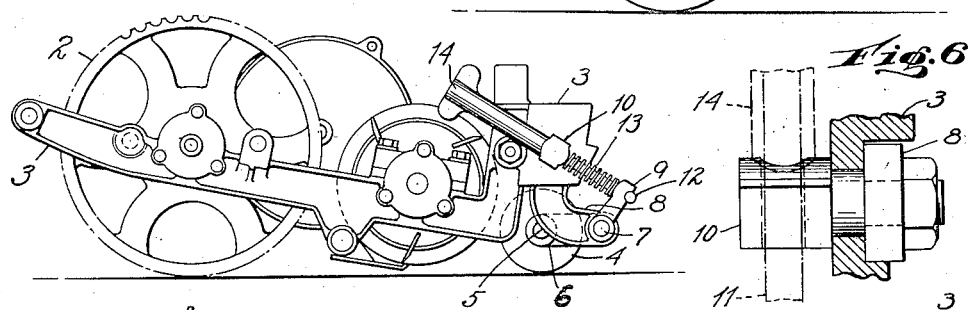
Fig. 6
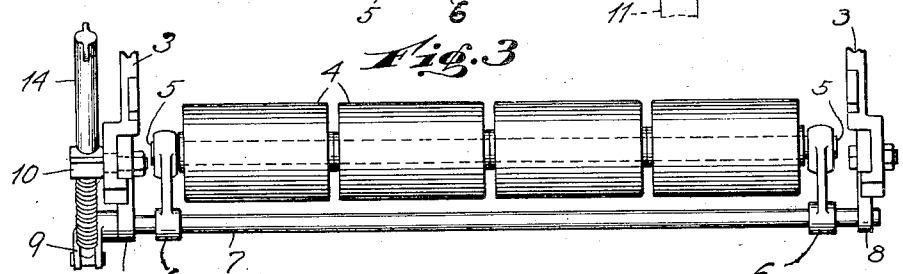
Fig. 3
Fig. 5
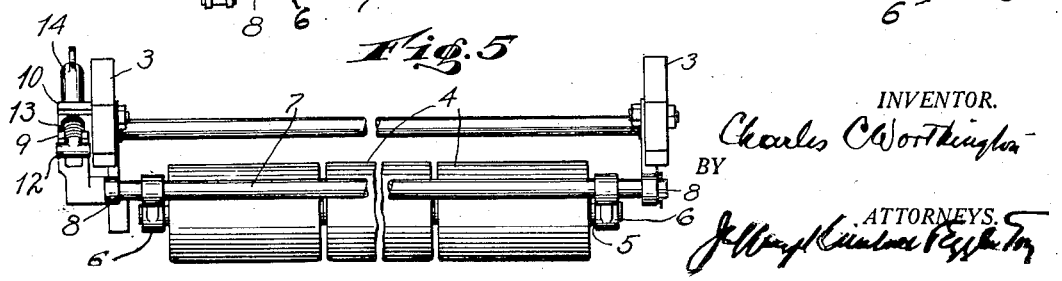
INVENTOR.
Charles C Worthington
BY
ATTORNEYS.

Patented Mar. 3, 1936

2,032,784

UNITED STATES PATENT OFFICE 2,032,784

GANG LAWN MOWER

Charles C. Worthington, Dunfield, N. J.

Application March 10, 1933, Serial No. 660,213

4 Claims. (Cl. 56—7)

The invention is an improvement in motor-driven gang lawn mowers of the kind adapted for mowing putting greens and affords a means for improving the work done by those machines. When a putting green is mowed by a gang of lawn mower units, the objection has been made that the appearance of the green after mowing is not quite the same and not as satisfactory as when it has been mowed by hand with a single mower, and I have found that the difference is due to extremely slight variations, otherwise unnoticeable and inconsequential, in the height of the cuts produced by the individual units of the gang and that the slightest departure from exact uniformity in the heights of the cuts is sufficient to give rise to this criticism. As stated, such departures are of an order so small that except when occurring in a gang mower and on a putting green would not be objectionable or even discernible. Mower units, as heretofore made, are not adapted for regulating the height of cut to the degree I have found necessary to correct the difficulty and indeed there is no call for such nicety of adjustment under other circumstances. In such mowers height of cut is adjusted by raising or lowering the position of the gauge roller in the frame of the unit, i. e. relatively to the cutter mechanism thereof. Prior adjusting means have not been suited to the purpose of fine adjustment, because for the most part such adjusters require to be loosened or unclamped, as by the unscrewing of nuts or bolts in order to permit the roll carrying journal bracket to be moved and such bracket while relieved of the clamping pressure is free to slip or fall away from its original setting. This makes a nice adjustment or small change from an original setting so difficult as to be practically impossible for the purposes of the case in hand. If not subject to this common objection, prior adjusters are awkward of use requiring the roller brackets, one at each end of the gauge roller, to be separately adjusted and of course equalized in their adjustment and in some cases also requiring the unit to be turned bottom side up, a manipulation not quickly done in a gang machine. Certain types of adjusters in the prior art are provided with series of notches or bolt holes each adapted to hold the roll journal brackets in a predetermined position, but I have found that the positions thus predetermined by the notches are not only too widely spaced for fine adjustment but will vary in different machines, even of the same make, to such an extent as to preclude the necessary close equalization of the heights of the cut of the several units which it is my object to obtain.

The present invention consists in an adjuster for the lawn mower units of a gang of such units which is single to each unit, self-locking in the sense that the roll journal holder is at no time free to fall away from any particular setting and of extremely fine adjustment capability such as can only be produced by a screw thread or the like of adequately slow pitch.

In the accompanying drawing, Fig. 1 is a plan view of a putting-green gang mower of the type shown in Patent No. 1,825,109 and composed of a walk-type tractor organized with a gang of putting green units in overlapping relation; these units as well known are specially designed for putting green use and are not useful elsewhere. They give normally an extremely short and even cut of the grass; Fig. 2 is a side view of one of such units; Fig. 3 a top plan of the adjustable roller thereof and its holding means; Fig. 4 an end elevation of the latter; Fig. 5 a rear elevation of the roll and Fig. 6 a detail.

The several units will be understood to be connected and organized with the tractor 1 in any appropriate way, whereby they mow overlapping swaths. Each unit will be seen to be of conventional design having a pair of twin driving rollers 2, side frame sections 3 and a front gauge or roller 4, the adjustment of which relatively to the frame varies the height of the ledger knife or cutter mechanism away from the ground. The gauge roller 4 supports the front end of the unit frame in the case in hand, and may be constituted of a series of short roll sections as indicated or, within the meaning of the term gauge as herein used, may be formed in any other way suited to support the unit. As here shown it is journalled to rotate on an axis represented by the shaft 5 carried in the arms 6 of a rock shaft 7. This rock shaft 7 is journalled in the forward ends or brackets 8 of the side frames and at one end is provided with an actuator arm 9 fast thereon. By means of this actuator arm the rock shaft is normally held fixed or locked in a selected angular position but is adapted to be rotated by means of the same arm for raising and lowering the position of the gauge member 4 with respect to the cutter mechanism, thus changing the height of the cut. For this purpose it is connected with an anchor lug 10 on the side frame by means of an adjustment screw 11. The screw 11 has a T-shaped head 12 held in open notches on the lower side of the actuating arm 9 by the pressure of a helical spring 13 interposed between the arm and lug and around the screw. The shank of the screw extends through a hole or slot in the anchor lug, wide enough to accommodate any angular movement of the screw, and is provided with a wing nut 14 bearing on the lug. The contacting surfaces of the wing nut and anchor lug are cylindrical, the cylindrically concaved end of the nut bearing upon the cylindrical convexed side of the lug and pressed thereagainst by the spring.

It will be apparent that the spring serves two purposes; first it holds the actuating arm snugly against the T-head 12 of the adjusting screw 11, avoiding any lost motion at this point and second, it holds the wing nut against accidental rotation, this being due to the curvature of the engaging faces of lug and nut just referred to and serving to retain the nut at half-turn intervals. Rotation of the nut each half turn shortens or lengthens the effective length of the screw by a small amount and thereby correspondingly varies the relative position of the gauge member with reference to the cutter mechanism.

By virtue of the rock shaft, a single adjusting nut situated at one side of the unit serves to adjust both ends of the roller simultaneously and equally, and the fixing of the actuating arm 9 on the rock shaft so that it extends somewhat upwardly as indicated, disposes the adjusting screw and its wing nut in an oblique or sloped position, so that the grass boxes 15 which must be placed on the units are appropriately accommodated and do not interfere with the use of the adjuster nuts.

When the gang mower is in use with the boxes in place, the several adjuster nuts, one on each unit, are available and very accessible to be turned, as found necessary after trial, so as to produce exact equalization of the action of each, thereby producing a uniformity of grass surface which obviates the objection above referred to and is best suited for accuracy of putting. It may be noted that the adjusting screw 11 is a power-multiplying and motion-reducing operating-connection between the adjuster nut and the gauge member, as will be apparent, and its power-multiplying ratio is so high that pressure or impacts on the gauge member are incapable of reversely operating the adjuster nut, thus changing the adjustment, that is to say, the operating connection between the nut and gauge is irreversible, so that adjustments through small increments can be made without any unbolting or subsequent tightening operations, the adjuster being both the adjusting and the supporting means for the gauge. The process of equalizing the heights of the several cuts is thus executed by simply turning with the fingers one or the other adjuster, as the appearance of the swath indicates, until the desired uniform effect is obtained.

I claim:

1. In a gang lawn mower having overlapping lawn mower units of the kind adapted for mowing putting greens and respectively having grass boxes, means for equalizing the mowing effect of the several units so as to produce a multiple swath of uniform appearance and height of cut by effecting small increments of change in the relation of the gauge supports with reference to their respective cutter mechanisms, said means comprising adjuster members, one only for each unit of the gang mounted on the frame of each unit of the gang and accessible from the upper side of the unit for operation without disturbing the action of the unit, a power-multiplying operating-connection between said adjuster member and the gauge support of its unit adapted for moving said support relatively to the cutter mechanism to change the height of the cut, the power-multiplying ratio of said operating connection rendering it incapable of reversely actuating said adjuster member and adapting it to produce and hold small adjustment changes, and means for preventing accidental movement of said adjuster.

2. In a gang lawn mower having overlapping lawn mower units of the kind adapted for mowing putting greens and having grass boxes, means for equalizing the mowing effect of the several units so as to produce a multiple swath of uniform appearance and height of cut by effecting small changes in the relation of the gauge roller with reference to the cutter mechanism of the unit, said means comprising rotary adjuster members, one only being mounted on the side frame of each unit of the gang and located at the side of the grass box normally supported thereon, and being accessible without removing said box, a screw-thread operating-connection between each said adjuster member and the gauge roller of its unit adapted for moving both bearings of said roller relatively to the cutter mechanism by turning said adjuster member, the pitch of said screw thread being slow enough to prevent actuation of the adjuster by the roller, and means for preventing accidental turning of said adjuster.

3. A lawn mower unit for use in gang lawn mowers for putting greens comprising side frames containing rotary cutter mechanism and having front and rear supporting members and means for adjusting one of said members comprising a rock shaft on which said member is carried, an arm fixed to said rock shaft at one end thereof, a screw fixed to said arm, a rotary adjuster engaged to said screw and means for locking said adjuster against accidental rotation.

4. In a gang lawn mower having overlapping lawn mower units of the kind adapted for mowing putting greens and respectively having grass boxes, means for equalizing the mowing effect of the several units so as to produce a multiple swath of uniform appearance and height of cut by effecting small increments of change in the relation between the gauge rollers and the cutter mechanisms of certain of said units, said means comprising rotary adjuster members, one only for each of said units, each said adjuster member being mounted on the frame of its unit adjacent the grass box thereof and accessible from the upper side of the unit for hand operation without disturbing the action of the unit, a power-multiplying operating-connection between said adjuster member and the gauge roller of its unit adapted for moving said roller relatively to the cutter mechanism to change the height of the cut, the power-multiplying ratio of said operating-connection rendering it incapable of reversely actuating said adjuster member and adapting it to produce and hold small adjustment changes, and means for preventing accidental movement of said adjuster member comprising a part on said adjuster member having notch engagement with a stationary part adapted to hold said member at predetermined equal intervals of adjustment.

CHARLES C. WORTHINGTON.